UNITED STATES PATENT OFFICE.

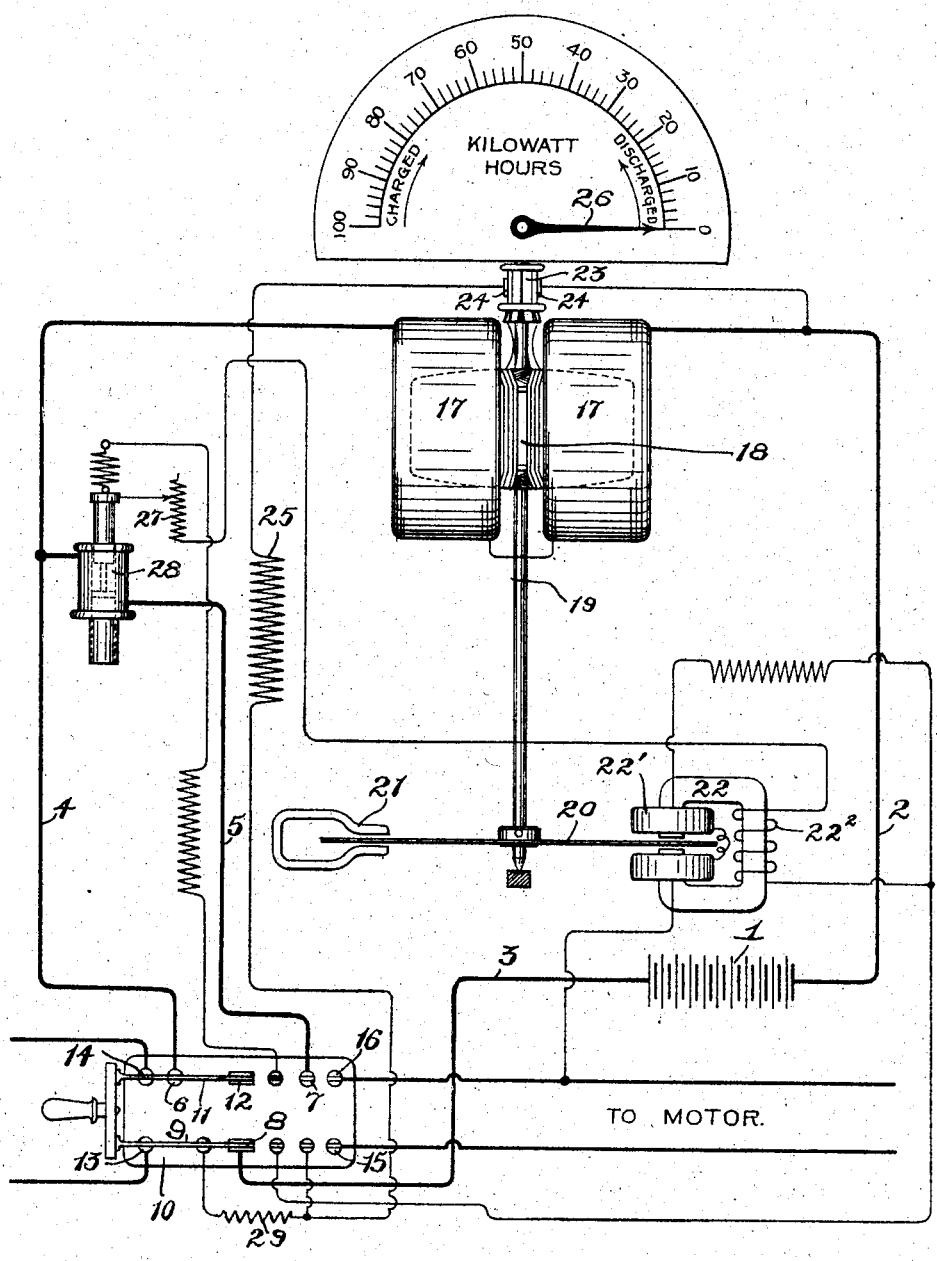

THOMAS DUNCAN, OF CHICAGO, ILLINOIS.

ELECTRICAL MEASURING INSTRUMENT.

No. 796,052.      Specification of Letters Patent.      Patented Aug. 1, 1905.

Application filed August 26, 1901. Serial No. 73,328.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to meters adapted for use in connection with storage batteries, and has for its object the provision of a meter that is adapted to rotate at different rates of speed per unit of load or energy upon variations in the rate of battery discharge.

By means of my invention the meter is caused to operate at an increased rate of speed per unit of load or energy upon an increase in the rate of discharge.

In the use of storage batteries it is well known that the output of the battery will always be less than the energy stored therein and that the battery loss will increase upon a sufficient increase in the rate of battery discharge. For example, if the battery is charged one thousand ampere-hours at its normal rate of charge—say one hundred amperes for ten hours—the total discharge at the same rate which can be made available without harm to the battery will not be more than about eighty per cent. of the energy charged into the battery with some makes of battery, this battery loss varying with different makes—that is, the battery will effectively operate at one hundred amperes for eight hours, giving out eight hundred ampere-hours after having received one thousand. If the rate of discharge is increased, the total output will be diminished. For example, with certain makes of battery the energy discharged will not be over about seventy per cent. if the rate is increased to one hundred and forty amperes, sixty per cent. if the rate of discharge is doubled, and forty per cent. if the rate of discharge is quadrupled.

I have provided an instrument that is adapted to compensate for the varying battery losses due to the varying rates of discharge, so that the user of the battery may know when the available energy in the battery is spent. Ordinarily a meter associated with a storage battery that is discharged at varying rates will indicate the presence of more energy in the battery than actually exists. The meter of my invention is also adapted to measure the energy that is being stored in the battery, the meter when thus associated with the charging source of current being operatively dissociated from the means that cause the meter to operate at varying rates of speed per unit of load or energy at different rates of discharge.

The meter of my invention is particularly adapted for use in connection with motors employed in operating motor-vehicles where the rate of discharge is not constant, but is liable to be changed at any time. The preferred means of causing this variation in the rate of operation of the meter consists in the provision of a variable load that is automatically controlled by means subject to the variable volume of current flowing from the battery. This load is preferably in the form of an electromagnetic drag acting upon a disk coupled with the rotating element of the meter and having a winding subject to the pressure of the battery. This electromagnet is also provided with a second winding, preferably in shunt of the battery, which acts in opposition to the main magnet shunt-winding in a degree dependent upon the flow of current or rate of discharge to decrease the force of the drag and permit the speed of the disk and rotating element of the meter to increase as the rate of discharge increases.

In my present invention I include a rheostat in circuit with the load-modifying or secondary coil of the braking electromagnet, a solenoid or electromagnetic device in series with the battery being provided for governing the amount of resistance of the rheostat in circuit with the load-modifying winding, the operation of this second electromagnet varying with the rate of battery discharge, so that the load is correspondingly varied to produce varying rates of operation of the meter per unit of load or energy.

I will explain my invention more fully by reference to the accompanying drawing, which is a diagrammatic view of a storage-battery system with the meter of my invention associated therewith.

In the drawing a storage battery 1 is illustrated, having mains 2 and 3. The main 2 is provided with bifurcated branches 4 5, terminating in contacts 6 and 7, while the main 3 terminates in a pivotal mounting 8, upon which a switch-blade 9 of a switch 10 is secured. A second switch-blade 11 of the switch 10 is also placed upon a pivotal mounting 12. Terminals of a charging-circuit 13 and 14 are illustrated. Terminals 15 and 16 of conductors leading to translating means, as the motor of a motor-vehicle, are also illustrated.

When the switch 10 is thrown to the left, the charging machine or source of current is thrown into circuit with the storage battery. When the switch is thrown to the right, the storage battery is thrown into circuit with the translating means.

I have illustrated a meter having a current-winding included in the main 2, this current-winding being subdivided into coils 17 17. The meter is also provided with a pressure-winding 18, included in bridge between the battery leads or mains. These windings of the meter are constantly in circuit with the battery irrespective of its association with the charging-machine or the translating means. The meter-winding 18 is preferably in the form of an armature and is mounted upon a spindle 19, at the lower end of which is provided a disk 20, arranged within the fields of damping 21 22. The shaft 19 also carries the commutator 23, against which bear brushes 24 24, that serve to include the armature of the meter in circuit, a choking resistance 25 being also included in circuit with the armature.

The meter is provided with gearing at its upper end to actuate the measuring-index 26, which by coöperation with a suitable reading-scale serves to indicate the amount of energy stored in the battery in charging and remaining in the battery in discharging. The meter illustrated is adapted to measnre in units of kilowatt-hours.

The main winding $22'$ of the electromagnet 22 is preferably included in an independent shunt-conductor. The core of the magnet 22 is provided with a second shunt-winding $22^2$. The winding $22^2$ is included in circuit with the resistance 27 of a rheostat, the rheostat-arm being mounted upon the core of a solenoid or other suitable form of solenoid 28, the winding of the solenoid being included in the branch conductor 5.

When the switch 10 is thrown to the right, the conductor 5 is included in series with the storage battery, the strength of the magnet 28 then varying according to the rate of battery discharge. By the same manipulation of the switch the windings of the magnet 22 are included in circuit with the battery. When the switch is thrown to the left, all of these windings are excluded from circuit. When these windings are included in circuit with the battery, every change in the rate of discharge is accompanied by a corresponding change in the strength of the solenoid 28, whereby more or less of the resistance 27 is included in circuit with or excluded from the circuit including the winding $22^2$. This winding $22^2$ creates a magnetizing force opposing that due to the main winding $22'$. By varying the amount of resistance included in circuit with the winding $22^2$ the degree of this opposing magnetizing force is varied. For example, if the rate of battery discharge is increased the core of the solenoid 28 will be further attracted, thereby cutting out more of the resistance 27, permitting an increase of the magnetizing force due to the winding $22^2$, lessening the resultant braking action of the magnet 22, permitting the speed of the meter to increase per unit of load or energy. If the rate of battery-discharge decreases, the solenoid will permit its core to be withdrawn, thus including more resistance in circuit with the winding $22^2$ to decrease the opposing magnetizing force due thereto, thereby causing an increase in the load due to the magnet 22, reducing the rate of operation of the meter per unit of load or energy.

To compensate for the removal of the load furnished by the electromagnet 22 when the storage battery is connected with the charging-machine, I provide a resistance 29, that is included in circuit with the armature when the storage battery is thus connected with the charging-machine to reduce the torque of the meter, this resistance 29 being removed from circuit when the load-producing magnet 22 is again included in circuit.

Having thus described my invention, I claim as new and desire to secure by Letters Patent—

1. The combination with a storage battery, of a meter for measuring the energy discharged, a load for the meter containing a damping-electromagnet having a load-producing winding subject to the pressure and a second winding for opposing the first winding, a rheostat having its resistance in circuit with the second winding, and an electromagnetic device in series with the battery for varying the amount of resistance in circuit with the second winding to vary the opposing electromotive force thereof, whereby the meter may operate at different rates of speed per unit of load or energy, according to the rates of battery discharge, substantially as described.

2. The combination with a storage battery, of a meter for measuring the energy discharged, a load for the meter containing a damping-electromagnet having one winding for furnishing the load, and a second winding for opposing the first winding, a rheostat having its resistance in circuit with the second winding, an electromagnetic device for varying the amount of resistance in circuit with the second winding to vary the opposing electromotive force, whereby the meter may operate at different rates of speed per unit of load or energy, according to the rates of battery discharge, and a switching device for excluding the load-producing magnet from circuit when the battery is in circuit with the charging machine or source of current, substantially as described.

3. The combination with a storage battery, of a meter for measuring the energy discharged, a load for the meter containing a damping-electromagnet having a load-producing winding subject to the pressure of the battery and a second winding for opposing the first winding, a rheostat having its resistance in circuit with the second winding, an electromagnetic device for varying the amount of resistance in circuit with the second winding to vary the opposing electromotive force thereof, whereby the meter may operate at different rates of speed per unit of load or energy, according to the rates of battery discharge, and a switching device for excluding the load-producing magnet from circuit when the battery is in circuit with the charging machine or source of current, substantially as described.

4. The combination with a storage battery, of a meter for measuring the energy discharged, a load for the meter containing a damping-electromagnet having one winding for furnishing the load and a second winding for opposing the first winding, a rheostat having its resistance in circuit with the second winding, an electromagnetic device in series with the battery for varying the amount of resistance in circuit with the second winding to vary the opposing electromotive force thereof, whereby the meter may operate at different rates of speed per unit of load or energy according to the rates of battery discharge, and a switching device for excluding the load-producing magnet from circuit when the battery is in circuit with the charging machine or source of current, substantially as described.

5. The combination with a storage battery, of a meter for measuring the energy discharged, a load for the meter containing a damping-electromagnet having a load-producing winding subject to the pressure of the battery and a second winding for opposing the first winding, a rheostat having its resistance in circuit with the second winding, an electromagnetic device in series with the battery for varying the amount of resistance in circuit with the second winding to vary the opposing electromotive force thereof, whereby the meter may operate at different rates of speed per unit of load or energy, according to the rates of battery discharge, and a switching device for excluding the load-producing magnet from circuit when the battery is in circuit with the charging machine or source of current, substantially as described.

6. The combination with a storage battery, of a meter for measuring the energy discharged, a load for the meter containing a damping-electromagnet having one winding for furnishing the load and a second winding for opposing the first winding, a rheostat having its resistance in circuit with the second winding, an electromagnetic device for varying the amount of resistance in circuit with the second winding to vary the opposing electromotive force, whereby the meter may operate at different rates of speed per unit of load or energy, according to the rates of battery discharge, a switching device for excluding the load-producing magnet from circuit when the battery is in circuit with the charging machine or source of current, and means for reducing the torque of the meter upon the removal of the said load when the battery is connected with the charging source of current, substantially as described.

7. The combination with a storage battery, of a meter for measuring the energy discharged, a load for the meter containing a damping-electromagnet having a load-producing winding subject to the pressure of the battery and a second winding for opposing the first winding, a rheostat having its resistance in circuit with the second winding, and electromagnetic device for varying the amount of resistance in circuit with the second winding to vary the opposing electromotive force thereof, whereby the meter may operate at different rates of battery discharge, a switching device for excluding the load-producing magnet from circuit when the battery is in circuit with the charging machine or source of current, and means for reducing the torque of the meter upon the removal of the said load when the battery is connected with the charging source of current, substantially as described.

8. The combination with a storage battery, of a meter for measuring the energy discharged, a load for the meter containing a damping-electromagnet having one winding for furnishing the load and a second winding for opposing the first winding, a rheostat having its resistance in circuit with the second winding to vary the opposing electromotive force thereof, whereby the meter may operate at different rates of speed per unit of load or energy according to the rates of battery discharge, a switching device for excluding the load-producing magnet from circuit when the battery is in circuit with the charging machine or source of current, and means for reducing the torque of the meter upon the removal of the said load when the battery is connected with the charging source of current, substantially as described.

9. The combination with a storage battery, of a meter for measuring the energy discharged, a load for the meter containing a damping-electromagnet having a load-producing winding subject to the pressure of the battery and a second winding for opposing the first winding, a rheostat having its resistance in circuit with the second winding, an electromagnetic device in series with the battery for varying the amount of resistance in circuit with the second winding to vary the opposing electromotive force thereof, whereby the meter may operate at different rates of speed per unit of load or energy, according to the rates of battery discharge, a switching device for excluding the load-producing magnet from circuit when the battery is in circuit with the charging machine or source of current, and means for reducing the torque of the meter upon the removal of the said load when the battery is connected with the charging source of current, substantially as described.

10. The combination with a storage battery, of a meter for measuring the energy discharged, a load for the meter containing a damping-electromagnet having one winding for furnishing the load and a second winding for opposing the first winding, a rheostat having its resistance in circuit with the second winding, and electromagnetic means for varying the amount of resistance in circuit with the second winding to vary the opposing electromotive force thereof whereby the meter may be operated at different rates of speed per unit of load or energy, according to the rates of battery discharge, substantially as described.

11. The combination with a storage battery, of a meter for measuring the energy discharged, a load for the meter containing a damping-electromagnet having a load-producing winding subject to the pressure of the battery and a second winding for opposing the first winding, a rheostat having its resistance in circuit with the second winding, and electromagnetic means for varying the amount of resistance in circuit with the second winding to vary the opposing electromotive force thereof, whereby the meter may operate at different rates of speed per unit of load or energy, according to the rates of battery discharge, substantially as described.

12. The combination with a storage battery, of a meter for measuring the energy discharged, a load for the meter containing a damping-electromagnet having one winding for furnishing the load and a second winding for opposing the first winding, a rheostat having its resistance in circuit with the second winding, and electromagnetic means in series with the battery for varying the amount of resistance in circuit with the second winding to vary the opposing electromotive force thereof, whereby the meter may operate at different rates of speed per unit of load or energy, according to the rates of battery discharge, substantially as described.

13. The combination with a storage battery, of a meter for measuring the energy discharged, a load for the meter containing a damping-electromagnet having one winding for furnishing the load, and a second winding for opposing the first winding, a rheostat having its resistance in circuit with the second winding, and electromagnetic means for varying the amount of resistance in circuit with the second winding, substantially as described.

14. The combination with a storage battery, of a meter for measuring the energy discharged, a load for the meter containing a damping-electromagnet having two opposing windings, a rheostat having its resistance in circuit with one of the windings, and means for varying the amount of the rheostat resistance in circuit with the said winding, substantially as described.

In witness whereof I hereunto subscribe my name this 16th day of August, A. D., 1901.

THOMAS DUNCAN.

Witnesses:
   GEORGE L. CRAGG,
   HERBERT F. OBERGFELL.